US012580805B2

(12) United States Patent
Zhang et al.

(10) Patent No.: US 12,580,805 B2
(45) Date of Patent: Mar. 17, 2026

(54) RESPONSIBLE INCIDENT PREDICTION

(71) Applicant: Microsoft Technology Licensing, LLC, Redmond, WA (US)

(72) Inventors: Yu Zhang, Sammamish, WA (US); Tianjun Shi, Sammamish, WA (US); Xiaoxiao Jiang, Bellevue, WA (US); Xuchao Zhang, Sammamish, WA (US); Zhenfeng Lin, Seattle, WA (US); Pedro Henrique Bragioni Las-Casas, Belo Horizonte (BR); Amitabh Nag, Redmond, WA (US); Di Guan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 56 days.

(21) Appl. No.: 18/422,798

(22) Filed: Jan. 25, 2024

(65) Prior Publication Data

US 2025/0247283 A1      Jul. 31, 2025

(51) Int. Cl.
*H04L 41/0631* (2022.01)
(52) U.S. Cl.
CPC ................................ *H04L 41/0631* (2013.01)
(58) Field of Classification Search
CPC .................................................... H04L 41/0631
See application file for complete search history.

(56) References Cited

U.S. PATENT DOCUMENTS

| | | | | |
|---|---|---|---|---|
| 11,831,490 | B1 * | 11/2023 | Chandrasekaran ... | H04L 41/064 |
| 2014/0129536 | A1 * | 5/2014 | Anand .................. | G06F 16/345 |
| | | | | 707/723 |
| 2020/0106660 | A1 * | 4/2020 | Kakani ............... | H04L 41/0645 |
| 2022/0107858 | A1 * | 4/2022 | Jain ..................... | G06F 11/0751 |

* cited by examiner

*Primary Examiner* — Kamal M Hossain
(74) *Attorney, Agent, or Firm* — Holzer Patel Drennan

(57) ABSTRACT

A disclosed method for incident dependency prediction includes identifying, for a newly-occurring network incident of interest, one or more similar historical incidents; obtaining causal dependency data for the one or more similar historical incidents, the causal dependency data identifying one or more historical responsible incidents responsible for causing the similar historical incidents; identifying candidate root cause incidents each occurring within a recent time interval and satisfying similarity criteria with a corresponding one of the one or more historical responsible incidents; and transmitting a prompt to an incident dependency prediction model, the prompt requesting prediction of a root cause incident responsible for causing the newly-occurring network incident of interest based on feature information for each of the candidate root cause incidents and for the incident of interest.

20 Claims, 9 Drawing Sheets

Training of Instruction-Tuned Graph Language Model

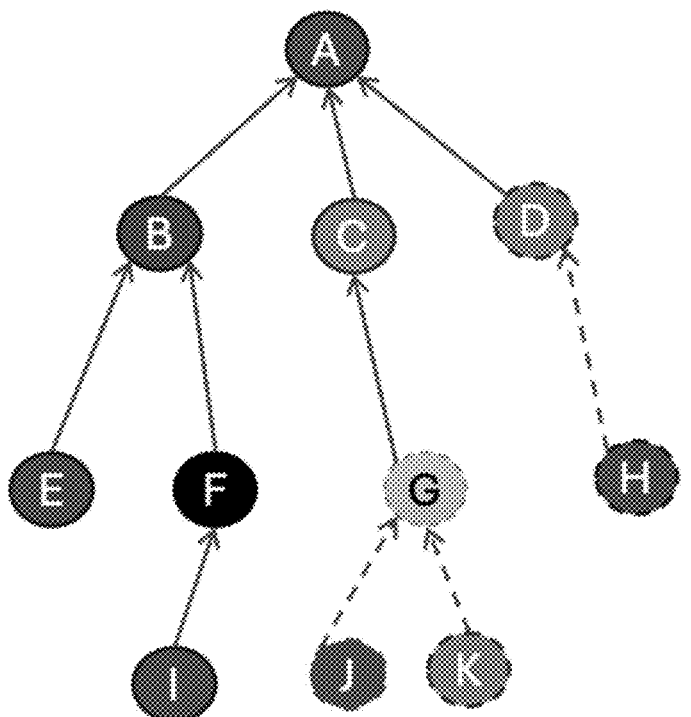
FIG. 4

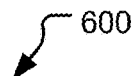
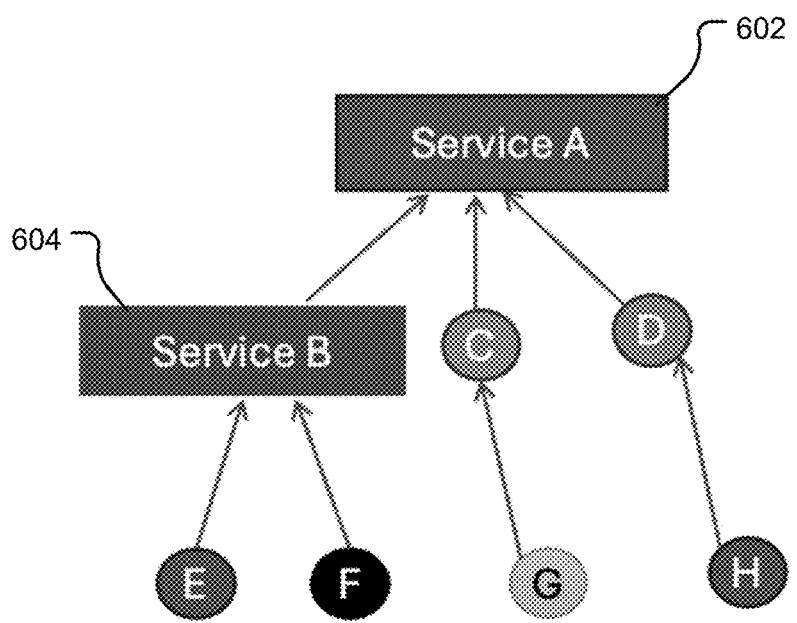
FIG. 6

700
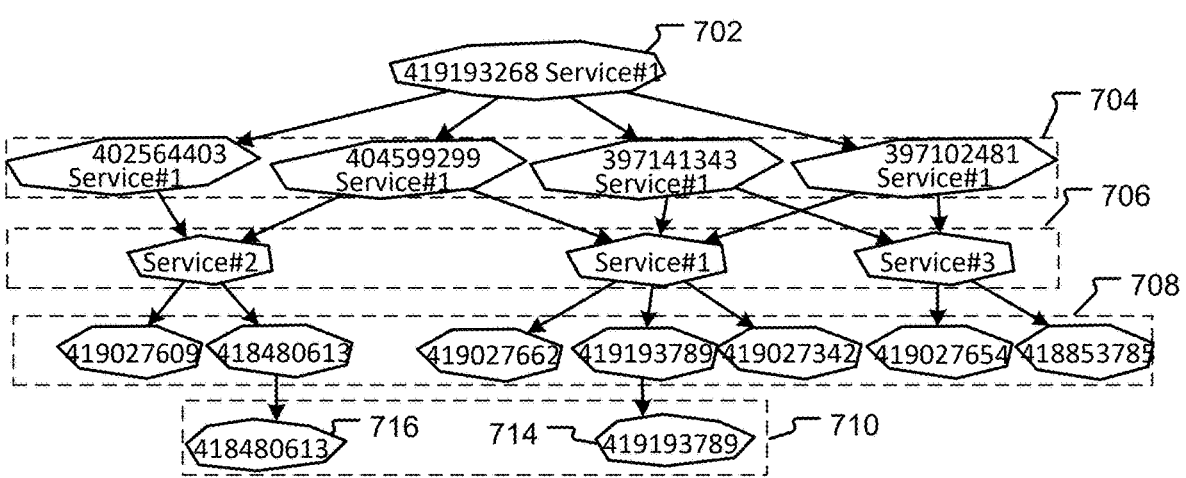
FIG. 7

800

Receive notification of a newly-occurring network incident of interest ⟋ 802

Identify similar historical incidents with feature information similar to the newly-occurring network incident of interest ⟋ 804

Obtain causal dependency information for the similar historical incidents ⟋ 806

Based on the causal dependency data, identify historical responsible incidents responsible for causing the similar historical incidents ⟋ 808

Identify candidate root cause incidents each occurring within a recent time interval and having an association with a corresponding one of the historical responsible incidents ⟋ 810

Prompt an incident prediction model to predict which of the candidate root cause incidents is responsible for causing the newly-occurring network incident of interest, the prediction being based on feature information for the newly-occurring network incident of interest and the feature information for each of the candidate root cause incidents ⟋ 814

Receivr, from the incident prediction model, a predicted root cause incident for the newly-occurring network incident of interest ⟋ 816

FIG. 8

RESPONSIBLE INCIDENT PREDICTION

BACKGROUND

In a cloud compute stack, cloud services that are customer-facing are often backed by layers of underlying cloud services that that provide functionality such as provisioning virtual machines (VM) for top-layer cloud service providers, control plane management of cloud configurations, database services, and more. When a service-disrupting incident occurs at a low-level of the stack this has the potential to cause other service-disrupting incidents for many higher-level stack services. These higher-level incidents can be viewed as "dependent incidents" in the sense that they are all caused—at least in part—by the same responsible incident, such as a database server outage, network connectivity issue, etc. In the field of cloud computing, significant challenges arise in relation to the swift and accurate identification of responsible incidents and related dependencies during events that cause customer service disruptions.

SUMMARY

According to one implementation, a method of predicting incident dependency includes identifying similar historical incidents characterized by feature information satisfying first similarity criteria with the feature information for a newly-occurring network incident of interest; obtaining causal dependency data for the similar historical incidents, the causal dependency data identifying historical responsible incidents responsible for causing the similar historical incidents; identifying candidate root cause incidents each occurring within a recent time interval and satisfying second similarity criteria with a corresponding one of the historical responsible incidents; transmitting a prompt to an incident dependency prediction model, the prompt requesting prediction of a root cause incident responsible for causing the newly-occurring network incident of interest, the prompt including feature information for the newly-occurring network incident of interest and the feature information for each of the candidate root cause incidents; and receiving, from the incident dependency prediction model, the root cause incident for the newly-occurring network incident of interest, the root cause incident identifying a select one of the candidate root cause incidents.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTION OF THE DRAWINGS

FIG. 4 illustrates an example incident dependency graph that is generated while constructing a training dataset for an incident dependency prediction model.

FIG. 6 illustrates an example of a service dependency graph that usable to identify set of candidate responsible incidents for an incident of interest.

FIG. 7 illustrates an information flow that exemplifies other example logical operations for incident dependency prediction.

FIG. 8 illustrates example operations for incident dependency prediction within a cloud-compute platform.

DETAILED DESCRIPTION

In current cloud compute environments, live site incidents (e.g., undesirable events such as outages and system malfunctions) are documented via automated and/or manual incident logging systems and addressed primarily by way of manual investigation. For example, an incident ticket is created by a service within the network stack that observes an incident. The ticket is initially forwarded to a service team responsible for the service. When the service team investigates and confirms that the incident appears external to the service, the ticket is forwarded to support personal of other lower-level stack services, allowing each team to sequentially investigate and, if appropriate, escalate the ticket down the stack until the responsible incident is identified. This methodology is inefficient and leads to prolonged downtime, increase service disruptions (e.g., for other dependent services that are subsequently affected by the same incident), and reduced overall reliability for users of the cloud compute platform.

The herein disclosed technology includes an automated incident investigation and responsible incident prediction system that cross-references real-time data from many different services of a compute stack to identify related recent incidents and to intelligently predict dependencies between incidents. According to one implementation, the disclosed technology relies on vector-based feature analysis for swift identification of current (e.g., co-occurring) incidents as well as similar historical incidents and their respective responsible incidents, which are—per the disclosed methodology-used to identify a set of current incident(s) as candidates responsible for causing an observed incident of interest.

The disclosed technology further includes an incident dependency prediction engine trained to predict, from a set of candidate incidents, a root cause incident that is responsible for another incident of interest. The incident dependency prediction engine is trained on incident features for historically-observed events as well as their respective hierarchical causal dependencies and uses learned relationships between the incident features and incident dependencies to predict relations between incidents given corresponding sets of incident features.

The herein disclosed responsible incident prediction system provides continuous monitoring of incidents logged with respect to services of a cloud compute network and automates incident attribution to facilitate rapid identification of responsible incidents and their related factors during live site events, thereby reducing service downtime, total number of service disruptions, and increasing reliability of the cloud compute platform.

Figure 1:
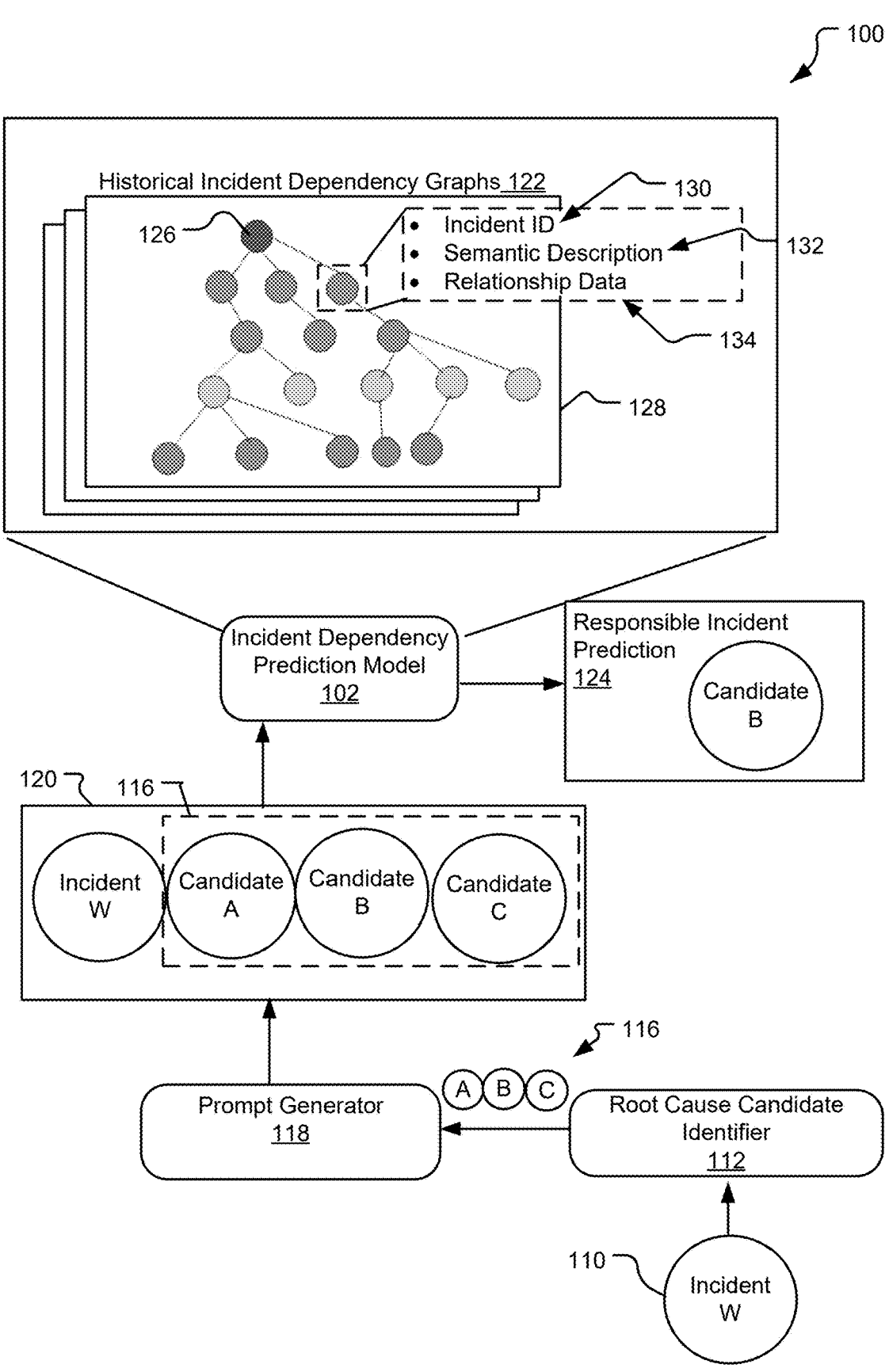
FIG. 1 illustrates aspects of an example system that performs responsible incident prediction within a cloud-compute platform.

FIG. 1 illustrates aspects of an example system 100 that performs responsible incident prediction within a cloud-compute platform. The system 100 includes a root cause candidate identifier 112, a prompt generator 118, and an incident dependency prediction model 102 that work in concert to generate a root cause prediction for incidents of interest.

As used herein, the term "incident" is used to refer to problematic events observed within a computer network, such as events that cause service disruptions of various types. An incident that acts as the root cause of a given chain of dependent incidents is referred to herein as being a "responsible incident" or a "root cause incident."

In one implementation, the system 100 is communicatively linked to a cloud compute platform (not shown) that includes a stack of cloud-based services that provide resources allowing service providers to operate and manage respective cloud-based services. Different network monitors (e.g., anomaly monitoring services) are deployed throughout the cloud compute platform to monitor various types of network telemetry. When a network monitor observes a series of telemetry values that satisfy predefined anomaly criteria, an alert is issued (e.g., to a service team that manages the monitor) and an incident ticket is created-either manually (by a service team member) or automatically by the network monitor. In response to creation of an incident ticket or other action performed in response to detection of a new incident that is of interest (e.g., concern and high priority) to a particular service provider, the system 100 receives an incident notification 110. In one implementation, the incident notification 110 includes various document incident features such as observed "symptoms" of the incident (e.g., high latency observed, high CPU utilization, resource unavailability), service(s) directly affected by the incident (e.g., the identity of a service that owns or a controls a monitor that detected the incident), the physical location of the monitor that detected the incident and/or network characteristics of the monitor, the type of incident (e.g., whether the incident is appears to be a recurring/duplicate incident, manually-reported incident, automatically-reported incident), and more.

In the example of FIG. 1, the incident notification 110 notifies the system 100 of a newly-occurring incident (Incident W). The incident notification 110 is received and initially processed by a root cause candidate identifier 112. For brevity and clarity of overall concept, example communications and actions of the root cause candidate identifier 112 are not shown or discussed with respect to FIG. 1 and are instead discussed in greater detail with respect to FIG. 2, below. According to one implementation, the root cause candidate identifier 112 applies chain-of-reasoning logic that guides a vector-based analysis to identify candidate responsible incidents 116 (e.g., Candidate A, Candidate B, and Candidate C) that have a high probability of causal dependency to the newly-occurring incident. Two incidents are said to be causally related when one of the two of the incidents served as a trigger that is responsible—at least in part—for causing the other event.

The root cause candidate identifier 112 conveys the candidate responsible incidents 116 to the prompt generator 118 that, in turn, prepares a prompt 120 for an incident dependency prediction model 102. The prompt 120 instructs the incident dependency prediction model 102 to predict which one of the candidate responsible incidents 116 is the actual responsible incident (e.g., the root cause of) the incident of interest (incident W). The prompt 120 includes feature information that describes the incident of interest (Incident W), as well as feature information for each of the candidate responsible incidents 116 (Candidate A, Candidate B, and Candidate C). Upon receipt of the prompt 120, the incident dependency prediction model 102 applies logic (e.g., model weights) learned from historical incident dependency graphs 122 to predict the root cause of the incident of interest, outputting a responsible incident prediction 124 (e.g., Candidate B) that is selected from the candidate responsible incidents 116.

The historical incident dependency graphs 122 represent training data that was used to train the incident dependency prediction model 102 to learn correlations between groups of incident features (e.g., incident symptoms) and incident relations (e.g., causal dependencies). Each of the historical incident dependency graphs 122 is characterized by a tree-like structure including nodes corresponding to historically-observed network incidents and edges respectively corresponding the causal dependencies between select pairs of the historically-observed network incidents. Each edge within one of the historical incident dependency graphs 122 belongs to a path that intersects a root node representing a root cause incident (e.g., a root cause incident 126) that is responsible, at least in part, for causing incidents corresponding to the various lower-level nodes along the path.

Each different one of the historical incident dependency graphs 122 identifies the dependencies of a different, historically-observed root cause incident. Each node in each of the graphs can be understood as storing an incident identifier 130 for a different incident and a semantic description 132 of the incident. The semantic description describes features of the incident and may, for example, includes symptoms of the incident, location where the incident was detected, and other information (e.g., information the same or similar to discussed above with respect to contents of the incident notification 110). In addition to storing the semantic descriptions for each incident (node), the historical incident dependency graphs 122 also store relationship data 134 that describes hierarchical relations between nodes of the graph—e.g., information that allows for a visual construction of incident dependency similar to that shown by example graph 128 in FIG. 1. In various implementations, the semantic relationship data is stored differently.

In one implementation, the incident dependency prediction model 102 is a graph-based model and the historical incident dependency graphs 122 are stored as part of a graph neural network (GNN). GNNs excel in capturing topological information by employing message passing and aggregation mechanisms. In an implementation where the incident dependency prediction model is a GNN, the relationship data is stored as part of the fabric of the model that defines pathways along which message passing and aggregation occur. One drawback of GNNs is that the message passing and aggregation operations are computationally expensive.

In another implementation, the incident dependency prediction model 102 is an instruction-tuned graph language model (e.g., InstructGLM) that utilizes a transformer-based large language model (LLM) to interpret graph structure and content provided in the form of natural language. Notably, a natural language sentence is capable of describing the connectivity at any desired hop levels within a graph. InstructGLMs leverage this capability to learn graph structure without the high-overhead message passing and propagation of GNNs. Further, InstructGLMs can be easily scaled for distributed training and inference on massive graphs due to the fact that graph structure can be injected into the model in the form of multiple natural language sentences that can be trained in mini-batches with independent gradient propagation relative to other sentences providing structure that is part of the same graph.

In an implementation where the incident dependency prediction model 102 is an instruction-tuned graph language model, the incident dependency prediction model 102 is trained on a dataset that includes semantic descriptions for each of multiple historically-observed network incidents and semantic relationship data identifying the causal dependencies among the historically-observed network incidents. The semantic relationship data for a given node describes, for example, the number of hops between the node and other related nodes that the model learns to understand as independent entities.

The incident dependency prediction model 102 uses learned relationships between the semantic descriptions of each incident and relationship data for the historical network incidents to predict the relationship data for the newly-occurring network incident of interest (incident W), facilitating generation of the responsible incident prediction 124.

Figure 2:
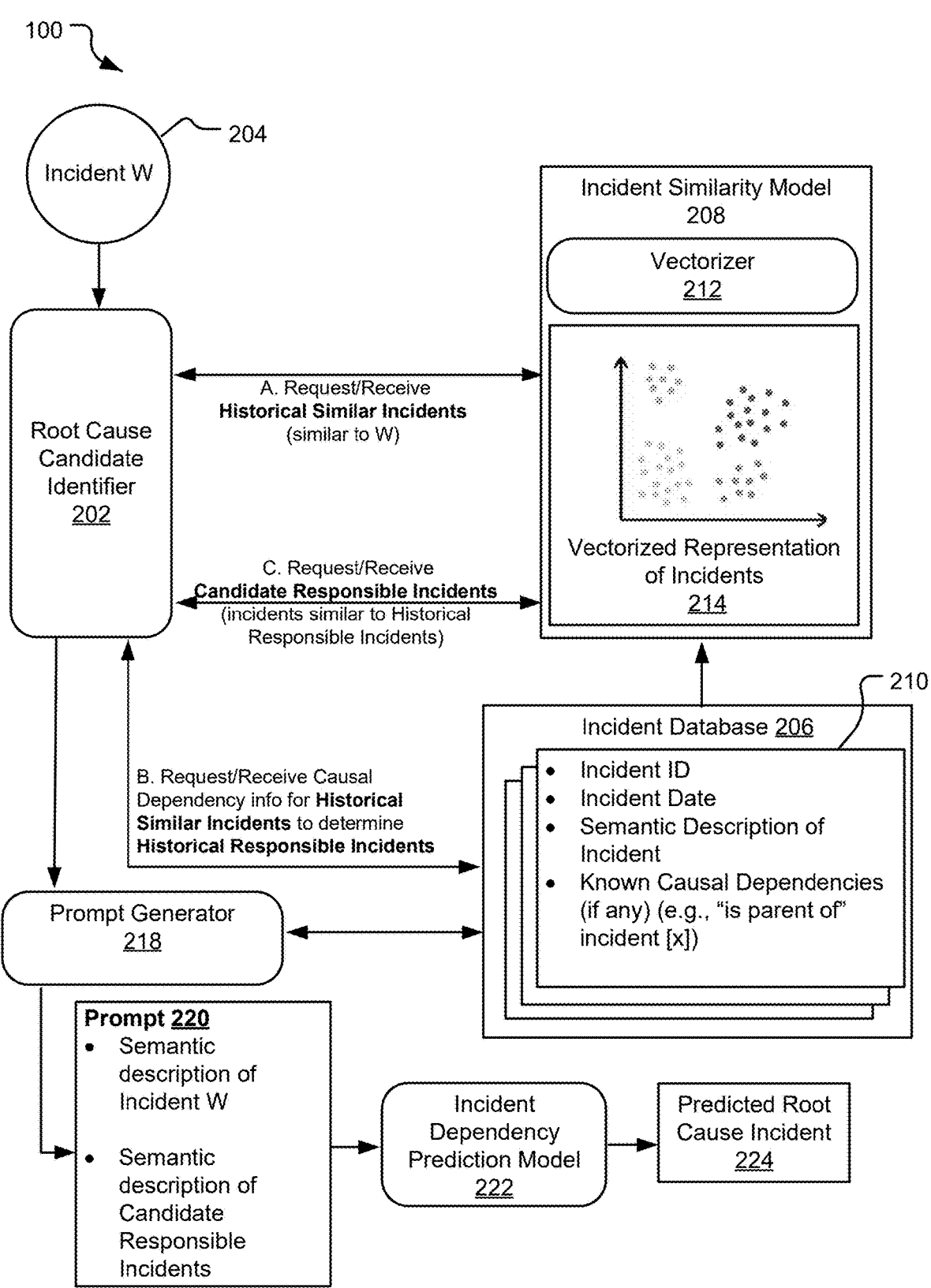
FIG. 2 illustrates aspects of another example system that performs responsible incident prediction within a cloud-compute platform.

FIG. 2 illustrates aspects of an example system 200 that performs responsible incident prediction within a cloud-compute platform. Like the system described with respect to FIG. 1, the system 200 includes a root cause candidate identifier 202 that receives notifications of newly-occurring incidents of interest. In FIG. 2, the root cause candidate identifier 202 is shown receiving notification for an incident 204 (Incident W), which is—for example—a recently-observed network incident causing an ongoing service disruption. In response to receipt of the notification for the incident 204, the root cause candidate identifier 202 applies a multi-step vector analysis to identify candidate responsible incidents (not shown) with a high probability of being responsible for causing to the incident 204.

In FIG. 2, executed by the root cause candidate identifier 202 is illustrated by arrows annotated as A, B, and C, which correspond to operations for querying and receiving data from external data sources including an incident database 206 and an incident similarity model 208. The incident database 206 can be understood as a centralized database that stores up-to-date incident log information of a cloud compute network. The incident database 206 stores feature information 210 for a vast number of incidents observed on the cloud compute network, including recent incidents (e.g., within the past day, week, month) and historical incidents (e.g., dating back months or years).

By example, the feature information 210 stored for each incident in the incident database 206 is shown to include an incident identifier that uniquely identifies an incident within the incident database 206, a timestamp of the incident, a semantic description of the incident, and causal dependencies for the incident (if known). The semantic description of the incident can, in various implementations, include different types of metadata describing the incident including symptoms of the incident and in some cases further information such as a classification or type of the incident, the service and/or monitor that initially detected the incident, investigation notes entered by an administrator such as documentation of steps taken to address or resolve the incident (if taken), and more. Upon ingest of a new incident to the incident database 206, the feature information 210 for the incident may be pulled from various sources such as externally-generated incident summaries (e.g., an incident summary automatically generated by an anomaly monitor or by a service provider administrator alerted to the incident), logfiles that relate to the incident, snapshots of telemetry data captured in relation to the incident (e.g., telemetry captured by an anomaly monitor that detected the incident) and/or other state information such as server and network configuration information, components states, and more.

The causal dependency information in the incident database indicates known dependencies between incidents. In one implementation, causal dependency information indicates whether the incident has been identified as a "parent of" another incident or a "child of" another incident. A first incident is said to be "parent of" a second incident when the first incident was responsible, at least in part, for causing the second incident. In contrast, the first incident is said to be a "child of" the second incident when the second incident is responsible, at least in part, for causing the first incident.

In one implementation, the incident database 206 is automatically updated to include each newly-observed incident in direct response to observance of the incident. For example, an anomaly monitor or network administrator may create an incident ticket that is ingested into the incident database 206. In some implementations, the feature information 210 for a given incident is appended to and updated over time, such as in response to incident investigation and/or resolution efforts. For example, related incidents (e.g., causal dependencies) may be discovered in time and added to the feature information 210 for an incident.

The incident similarity model 208 acts as a second data source that provides requested information to the root cause candidate identifier 202 in the illustrated flow of operations. In one implementation, the incident similarity model 208 is a machine learning model trained on the feature information 210 for some or all incidents stored in the incident database 206. The incident similarity model 208 includes a vectorizer 212 that vectorizes the feature information 210 for each incident into a vector space in which vector-to-vector separations correlate with a learned degree of similarity between the corresponding vectors. This vector space is represented in FIG. 2 as a "vectorized representation of incidents 214." Within the vectorized representation of incidents 214, two vectors corresponding to incidents characterized by very similar semantic descriptions (e.g., the incidents affect the same service and having similar symptoms such as a latency greater than 10 minutes) are characterized by a vector-to-vector separation that is small compared to two vectors corresponding to incidents characterized by comparatively dissimilar symptoms (e.g., the incidents affect different services and are characterized by dissimilar symptoms). By computing a similarity metric such as a dot product or cosine similarity between two vectors in the vectorized representation of incidents 214, the incident similarity model 208 is capable of quantifying similarity of the corresponding incidents.

Returning to the illustrated flow of operations, the root cause candidate identifier 202 initiates a candidate discovery process in response to receive notification of the incident 204. This candidate discovery process includes three queries to external data sources resulting in three sets of information (shown in FIG. 2 by bidirectional arrows A, B, and C, respectively), with each sequentially-retrieved set of information being used to identify and retrieve the next.

In a first step of this candidate discovery process (at arrow A), the root cause candidate identifier 202 queries the incident similarity model 208 to identify and return a set of historical incidents similar to the incident 204. For example, the root cause candidate identifier 202 specifies a historical time interval (e.g., more than two weeks prior) and provides the incident similarity model with an incident identifier and/or the feature information 210 for the incident of interest.

If the incident 204 has not yet been added to the vectorized representation of incidents 214, the vectorizer 212 vectorizes the feature information for the incident 204 and adds it to the vectorized representation of incidents 214. Otherwise, the incident similarity model 208 uses a vector identifier for the incident 204 that is provided by the root cause candidate identifier 202 to identify the previously-created vector corresponding to the incident 204.

The incident similarity model computes a similarity metric between the vector corresponding to the incident 204 and all other vectors within the vectorized representation of incidents 214 having timestamps corresponding to the specified historical time interval. Notably, timestamp information may be stored either within each vector or retrieved from the incident database 206 using the incident identifier. Based on the computed similarity metrics, the incident similarity model 208 selects and returns a set of Historical Similar Incidents (e.g., the set of incidents for which the computed similarity metric satisfies similarity criteria).

In response to receiving the set of Historical Similar Incidents identified as characterized by feature information (e.g., semantic descriptions) similar to the incident 204, the root cause candidate identifier 202 initiates a second query, illustrated by bidirectional arrow "B." This query is transmitted to the incident database 206 and requests causal dependency information for each incident included within the Historical Similar Incidents. From the causal dependency information, the root cause candidate identifier 202 identifies a set of "Historical Responsible Incidents," each of which is the responsible incident (e.g., root cause of) a corresponding one of the Historical Similar Incidents.

In response to identifying the Historical Responsible Incidents, the root cause candidate identifier initiates a third query, illustrated by bidirectional arrow "C." This query instructs the incident similarity model 208 to identify and return a set of recent incidents similar to the Historical Responsible Incidents. For example, the query includes the incident identifier for each of the Historical Responsible Incidents and specifies a recent time interval, such as the past week or 48 hours. In response to this query, the incident similarity model computes similarity metrics between each one of the Historical Responsible Incidents and all vectors in the vectorized representation of incidents 214 having timestamps corresponding to the specified recent time interval.

Based on these computed similarity metrics, the incident similarity model 208 selects and returns identifiers for a set of incidents determined to satisfy predefined similarity criteria (e.g., a similarity metric satisfying similarity criteria) with respect to a corresponding one of the Historical Responsible Incidents. This set of incidents is referred to herein as the "Candidate Responsible Incidents"—e.g., a set of recent incidents that has a sufficiently high likelihood of being responsible for the incident 204.

The root cause candidate identifier 202 provides incident identifiers for the Candidate Responsible Incidents to a prompt generator 218 which, in turn, generates a prompt 220 for an incident dependency prediction model 222. The prompt 220 includes a semantic description for the incident 204 and for each of the identified Candidate Responsible Incidents, which are in one implementation attained by querying the incident database 206 with incident identifiers for the Candidate Responsible Incidents.

In one implementation, the incident dependency prediction model 222 is a machine learning model with features the same or similar to those described with respect to the incident dependency prediction model 102 of FIG. 1. In response to the prompt 220, the incident dependency prediction model 222 uses learned associations between semantic descriptions of different incidents and the respective causal dependencies of those incidents to identify a select one of the Candidate Responsible Incidents with highest probability of being the responsible incident for the incident 204. Specific aspects of the incident dependency prediction model not described with respect to FIG. 2 are assumed to be the same or similar as those described with respect to FIG. 1. The incident dependency prediction model 222 outputs a predicted root cause incident 224 which is, for example, an incident identifier corresponding to a select one of the Candidate Responsible Incidents.

In response to the above-described operations, various types of remediation actions may be taken in response. In one implementation, information identifying the predicted root cause incident 224 is sent to the associated responsible service team, so as to supplement already-available incident information (e.g., pertaining to the nature of or extent of the incident) and thereby facilitate directed troubleshooting and more expeditious resolution of the root cause incident. Alternatively, or additionally, a notification is sent to a service team responsible for the incident 204. This notification can allow the responsible service team to identify and implementation action(s) effective to potentially reduce the extent of service disruptions observed while waiting for the root cause incident to be resolved. If, for example, the incident of interest is a high latency observed by customers of a video-streaming service and the root cause of the latency is a database node outage, the administrators of the video-streaming service may—with knowledge of the true root cause—be able to mitigate the extent of related service disruptions by altering a configuration to direct traffic to a different (redundant) database node.

In some implementations, the incident database 206 stores remediation information for historically-resolved incidents and the system 200 is further configured to suggest or automatically implement remediation measure. For example, the system 200 may access remediation information for the above-described Historical Responsible Incidents (specifically, for a select one of the Historical Responsible Incidents most similar to the predicted root cause incident 224) and suggest a similar measure be taken to resolve the root cause incident in the present cause.

Figure 3:
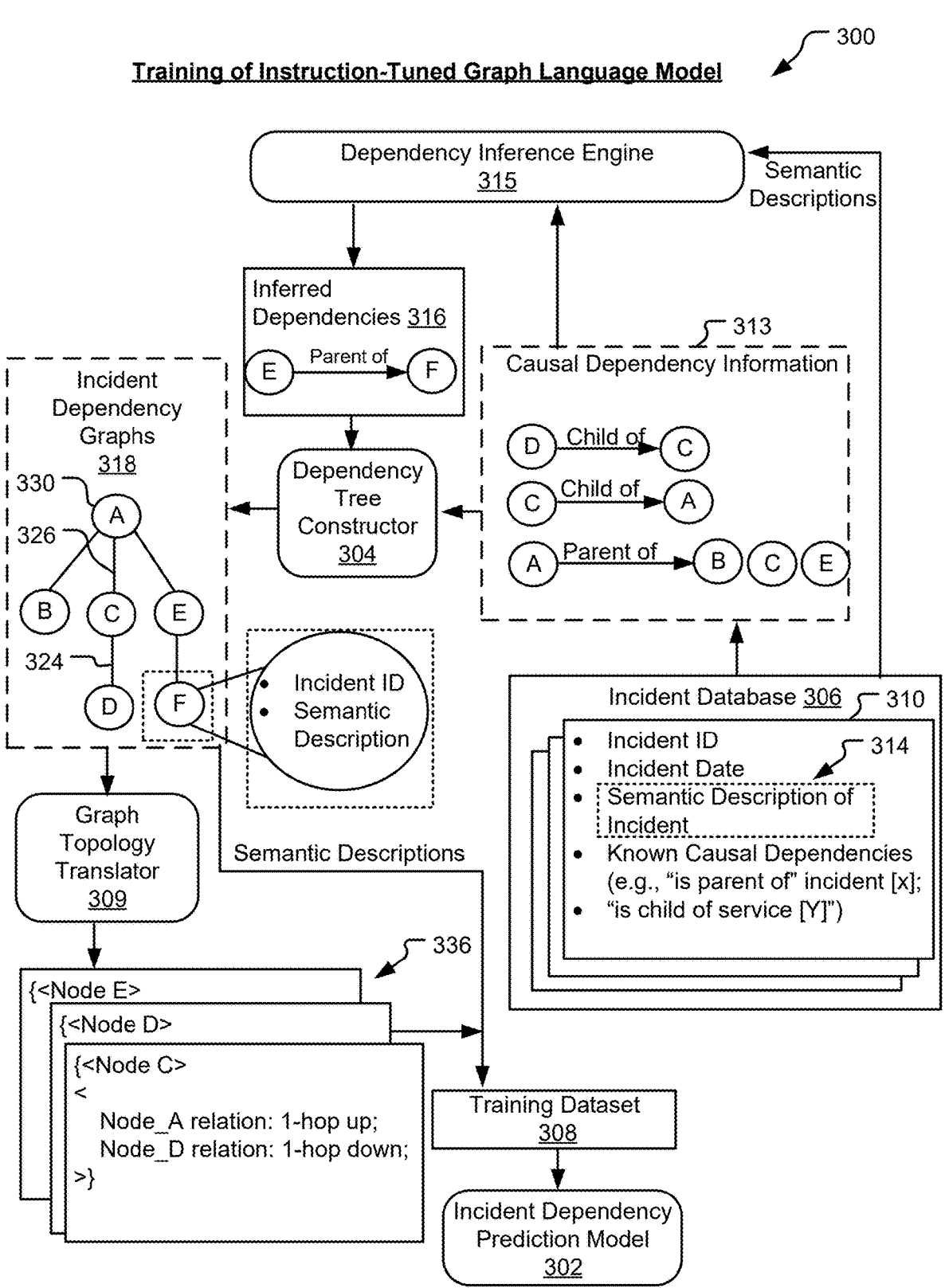
FIG. 3 illustrates an example system for training an incident dependency prediction model.

FIG. 3 illustrates an example system 300 for training an incident dependency prediction model 302 that performs operations the same or similar as the incident dependency prediction models described with respect to FIG. 1-2. The system 300 includes various software components including a dependency tree constructor 304, a dependency inference engine 315, and a graph topology translator 309, all of which perform different operations to prepare a training dataset 308 for the incident dependency prediction model 302. In the implementation of FIG. 3, the incident dependency prediction model 302 is an instruction-tuned graph language model that utilizes a transformer-based large language model (LLM) to interpret graph structure and content provided in the form of natural language.

Compilation of the training dataset 308 begins by extracting incident data from an incident database 306 that stores feature information 310 for a vast number of incidents observed on a cloud compute network. The feature information 310 includes the same or similar data types to those described with respect to the feature information 210 of FIG. 2 including, for example, an incident ID, incident timestamp, a semantic description 314 of each incident (e.g., symptoms observed, incident type), and causal dependency information 312.

In FIG. 3, example causal dependency information 313 illustrates parent/child relationships between pairs of historical incidents that may be stored in the incident database

306. Notably, some causal dependency information may be unknown, undocumented, or incompletely documented in real-world scenarios.

The dependency inference engine 315 is an artificial intelligence tool that performs actions to infer these types of unknown or undocumented causal dependencies in order to increase the size of the training dataset 308. In the disclosed implementation, the dependency inference engine 315 infers causal dependencies between incidents based on clues present in the feature information 310 of each incident which, in some cases include operator notes or other information that are suggestive of the responsible incident or responsible service. For example, it may be that the semantic description 314 for incident A includes an operator summary noting a suspicion that Incident A was caused by Incident B but, because of doubt, failure to follow-up/complete investigation, or other issues, the operator never properly logged the dependency between incident A and B.

According to one implementation, the dependency inference engine 315 includes an LLM signal extractor and a trained inference classifier. The LLM signal extractor vectorizes some or all of the feature information 310 for each logged incident to create an "incident signal vector" for each incident, and the trained inference classifier uses the incident signal vectors along with the causal dependency information 313 that has been documented for some incidents to infer dependencies between other incidents (e.g., undocumented dependences not presented within the causal dependency information 312 in the incident database 306). For example, the LLM signal vector creates an incident signal vector for each incident in the incident database by vectorizing aspects of the feature information 310 such as: descriptive texts such as incident title, summary, and discussion entries authorized by incident investigator(s); incident signal information describing observed symptoms of the incident observed and/or issues believe to be related to the incident; mitigation operations that were taken and whether they were successful; metadata such as the owning service (e.g., the service associated with a monitor that detected the incident), identifiers describing the location of the incident (e.g., a container identifier, server node identifier, server or virtual machine cluster identifier), the type of incident, and more.

Within the dependency inference engine 315, the incident signal vectors for the various incidents are fed into the trained inference classifier (also within the dependency inference engine 315) along with the causal dependency information 313 that is known. In one implementation, the trained inference classifier utilizes a positive unlabeled learning framework to infer positive associations (parent/child relations) between pairs of the incident signal vectors. Per this approach the known causal dependencies (a set of predefined positive associations) between pairs of the incident signal vectors are used to infer additional positive associations not originally documented.

The dependency inference engine 315 outputs inferred dependencies 316. In the illustrated example, the inferred dependencies 316 indicate that incident "E" is likely a parent of incident "F." This association is not present in the causal dependency information 313 that is extracted from the incident database 306.

The dependency tree constructor 304 uses the extracted causal dependency information 313 and the inferred dependencies 316 to construct an incident dependency graphs 318 for each different "family" of related incidents within the incident database 306. This step serves to translate the initially "flat" structure of the causal dependency information (e.g., with each incident indicating a single related incident or "hop") to a three-dimensional tree-like structure including nodes corresponding to the observed network incidents and edges respectively corresponding the known and inferred causal dependencies between select pairs of the observed network incidents. Within each one of the incident dependency graphs 318, each edge (e.g., an edge 324) belongs to a path (e.g., the edge 324 belong to a path that also includes edge 326) that can be traced back to a root node (e.g., root node 330) representing a root cause incident that is responsible, at least in part, for causing incidents corresponding to the lower-level nodes along the path and of all other paths in the same incident dependency graph (e.g., root node A corresponds to an incident that caused incidents B, C, D, E, and F). Each node in each of the incident dependency graphs 318 stores an incident identifier (e.g., matching the corresponding incident ID in the incident database 306) and the semantic description 314 that has been extracted from the incident database 306 for the corresponding incident.

Following generation of the incident dependency graphs 318, the graph topology translator 309 generates semantic relationship data 336 from the incident dependency graphs 318 that describes the physical topology of each of the incident dependency graphs 318. For example, the semantic relationship data 336 defines each node as a vector that includes the node identifier and a description of how the node is positioned within the corresponding one of the incident dependency graphs 318 in relation to all other nodes in the same path of the same graph. For example, the semantic relationship data 336 for node C in the illustrated graph indicates that node A is 1-hop up the tree and that node D is one-hop down the tree, thus describing the complete path A-C-D, as shown.

The training dataset 308 is then constructed to include, for each node, the semantic description 314 of the corresponding incident (e.g., the above-described incident signal vector embedding the feature information 310) and a vector including the semantic relationship data 336 for the node.

During each of multiple training operations of the incident dependency prediction model 302, the incident dependency prediction model 302 is provided with the incident signal vector for a target incident and the incident signal vectors for a subset of candidate responsible incidents, with one of the candidate responsible incidents being—by design—the actual responsible incident for the target incident. During the forward phase of the training iteration, the incident dependency prediction model 302 applies a set of weights to determine a probability corresponding to the existence of a causal dependency between the target incident and each of the candidate responsible incidents. Based on these computed probabilities, one of the candidate responsible incidents is selected as the root cause incident (e.g., the candidate having a highest causal dependency probability), and this is output by the incident dependency prediction model 302. During the backward phase of each training iteration, a loss function is computed to measure error, and the resulting error is then used to update model weights for the next training iteration. Notably, the use of the instruction-tuned graph language model facilitates training in mini-batches, meaning that the incident dependency prediction model 302 does not need to receive training data of all of the incident dependent graphs 318 to generate a prediction, and the prediction accuracy of the model can instead be tuned to acquire a desired degree of accuracy by gradually feeding additional sets of inputs derived from different incident dependency graphs 318 and/or portions of graphs.

Through this iterative training process, the incident dependency prediction model 302 learns the implicit correlations between the semantic descriptions 314 of different incidents and the actual dependencies of those relationships. Other aspects of the incident dependency prediction model 302 not discussed with respect to FIG. 3 can be understood as being the same or similar to other implementations described herein.

FIG. 4 illustrates an example incident dependency graph 400 that is generated while constructing a training dataset for an incident dependency prediction model, such as by the dependency tree constructor 304 of FIG. 3. In the example shown, each node in the incident dependency graph 400 corresponds to a different incident and edges between nodes are indicative of causal dependencies between pairs of corresponding incidents with the "responsible incident" being hierarchically positioned above the "dependent incident" within each pair. Nodes shown in solid circles (e.g., A, B, C, E, F) are intended to correspond to nodes for which the causal dependencies are initially known in full, such as due to the fact that a system administrator has created a "link" between the incidents within an incident logging system. In contrast, nodes in dotted circles (e.g., D, G, H, J, K) identify nodes for which the corresponding causal dependency information is initially unknown or incomplete. Dotted edges therefore represent "inferred relations." In one implementation, these relations are determined by a classifier (e.g., the dependency inference engine 315 of FIG. 3), which vectorizes feature information for each of the incidents and uses known dependencies to train a classifier using a positive-unlabeled training framework. The use of such as classifier can add significant breadth to the size of dataset used to train an incident dependency prediction model (e.g., per the operations described above with respect to FIG. 3).

Figure 5:
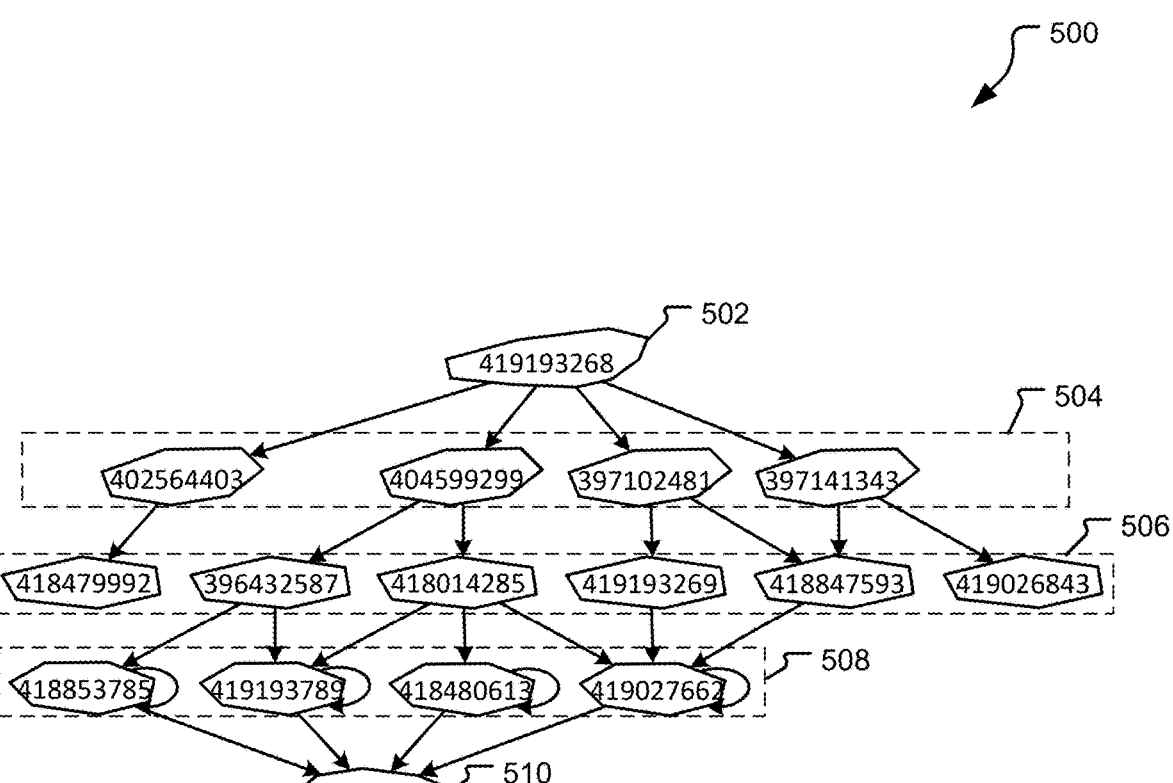
FIG. 5 illustrates an information flow that exemplifies logical operations for incident dependency prediction.

FIG. 5 illustrates an information flow 500 that exemplifies logical operations for incident dependency prediction. Different levels of the information flow 500 represent different querying operations.

In response to receiving notification of an incident of interest 502, a root cause candidate identifier queries an incident similarity model to discover Historical Similar Incidents 504 characterized by feature information that satisfies similarity criteria with the feature information for the incident of interest.

Following discovering of the Historical Similar Incidents, the root cause candidate identifier queries an incident database (not shown) to obtain causal dependency information for the Historical Similar Incidents. From this information, the root cause candidate identifier identifies one or more Responsible Incidents 506 that are each responsible for causing a corresponding one of the Historical Similar Incidents 504.

Following discovery of the Responsible Incidents 506, the root cause candidate identifier queries the incident similarity model to identify and return recent incidents (e.g., by specifying a recent time interval) that are characterized by feature information that satisfies a similarity metric with respect to feature information of any one of the Responsible Incidents 506. This query yields one or more Candidate Responsible Incidents 508.

Vectorized feature information for the Candidate Responsible Incidents 508 is provided as an input to an incident dependency prediction model (e.g., the incident dependency prediction model 222 or 302) along with the vectorized feature information for the incident of interest. The incident dependency prediction model outputs a root cause incident 510 that is predicted to be the root cause of the incident of interest 502.

FIG. 6 illustrates an example of a service dependency graph 600 that is, in some implementations, used to identify a set of candidate responsible incidents that are provided as input to an incident dependency prediction model (e.g., per the methodology described with respect to FIGS. 2 and 5). In contrast to the incident dependency graph illustrated with respect to FIG. 4, the service dependency graph 600 exemplifies causal dependencies between pairs of incidents and also between incidents and certain cloud services known to have caused those incidents.

In one implementation, the service dependency graph 600 can be used to identify a service (e.g., service 602 or 604) as responsible for a given incident and this service can then be used as a filter to improve accuracy of the incident dependency prediction system described herein. For example, when searching for candidates potentially responsible for causing a target incident (the "Candidate Responsible Incidents"), a responsible service can be used as a search filter can help to increase the probability that the identified Candidate Responsible Incidents include the true root cause of the target incident.

FIG. 7 illustrates an information flow 700 exemplifying additional logical operations for incident dependency prediction. Different levels of the graph 700 represent different querying operations. In response to receiving notification of the incident of interest 702, the root cause candidate identifier queries an incident similarity model to discover Historical Similar Incidents 704 characterized by feature information that satisfies similarity criteria with the feature information for the incident of interest.

Following discovering of the Historical Similar Incidents 704, the root cause candidate identifier queries an incident database (not shown) to obtain causal dependency information for the Historical Similar Incidents 704. In contrast to the operations described with respect to FIG. 5, the operations of FIG. 7 correspond to an implementation where the root cause identifier next identifies a set of services responsible for causing the Historical Similar Incidents ("Responsible Services 706") rather than a set of incidents responsible for causing the Historical Similar Incidents. Each of the Responsible Services 706 is, for example, documented (e.g., in an incident database) as being responsible for a corresponding one of the identified Historical Similar Incidents 704.

Following discovery of the Responsible Services 706, the root cause candidate identifier queries the incident similarity model to identify and return Candidate Responsible Incidents 708 that occurred recently (within a specified recent time interval) and that are known to have been caused by any of the Responsible Services 706. In one implementation, the incident similarity model also performs vector analysis on a group of candidates (e.g., subset of recent incidents identified as caused by any of the Responsible Services 706) to identify incident(s) characterized by vectorized feature information satisfying similarity criteria with the vectorized feature information for the incident of interest 702. This query yields one or more Candidate Responsible Incidents 708.

Vectorized feature information for the Candidate Responsible Incidents 708 is then provided as input to an incident dependency prediction model (e.g., the incident dependency prediction model 222 or 302) along with the vectorized feature information for the incident of interest 702. The incident dependency prediction model outputs a root cause prediction for the incident of interest. 702 In the illustrated example, the root cause prediction identifies two incidents 716 and 714 from the Candidate Responsible Incidents 708 as having a high probability (e.g., in excess of a predefined threshold) as being responsible for the incident of interest 702. Other implementations may return a single identified root cause incident or greater than two root cause incidents.

FIG. 8 illustrates example operations 800 for incident dependency prediction within a cloud network. A receiving operation 802 receives notification of a newly-occurring network incident of interest, such as an incident that is currently known to be causing a service disruption. An identification operation 804 identifies similar historical incidents characterized by feature information that satisfies similarity criteria with the feature information for the newly-occurring network incident of interest. In one implementation, the identification operation 804 includes prompting an incident similarity model (e.g., the incident similarity model 208 of FIG. 2) to compute a vector-based similarity metric, such as a cosine similarity or dot product, with respect to each of multiple vectors corresponding to historical incidents. Based on the vector-based similarity metric, the similar historical incidents are defined to include a subset of those historical incidents for which the computed similarity metric exceeds a defined threshold.

A retrieval operation 806 retrieves causal dependency information for the similar historical incidents and another identification operation 808 identifies, from the causal dependency information, a set of historical responsible incidents that are each responsible for causing one or more of the similar historical incidents. For example, the retrieval operation 806 entails retrieving the causal dependency information from a database and/or from a stored incident dependency graph to identify a "parent incident" associated with each of the historical responsible incidents.

Another identification operation 810 identifies a set of candidate root cause incidents have occurred within a specified recent time interval (e.g., the past 48 hours) and that are associated with (e.g., identified as similar to) a corresponding one of the historical responsible incidents. In one implementation, the identification operation 810 identifies incidents occurring within the specified recent time interval that are known to be caused by a same service that caused a corresponding one of the historical responsible incidents. In the same or another implementation, the identification operation 810 identifies incidents occurring within the specified recent time interval that are characterized by feature information satisfies similarity criteria with the feature information for any of the historical responsible incidents (e.g., a similarity metric computed based on the feature information exceeds a defined threshold).

A prompt generation and transmittal operation 812 prompts an incident dependency prediction model to predict which of the candidate root cause incidents is responsible for causing the newly-occurring network incident of interest. In one implementation, the requested prediction is based on feature information for the newly-occurring network incident of interest and the feature information for each of the candidate root cause incidents. In implementations, the incident dependency prediction model has characteristics the same or similar to any of the incident dependency prediction models described herein (e.g., the incident dependency prediction model 102, 222, or 302).

A prediction receipt operation 814 receives, from the incident dependency prediction model, a predicted root cause incident that is selected from among the candidate root cause incidents.

Figure 9:
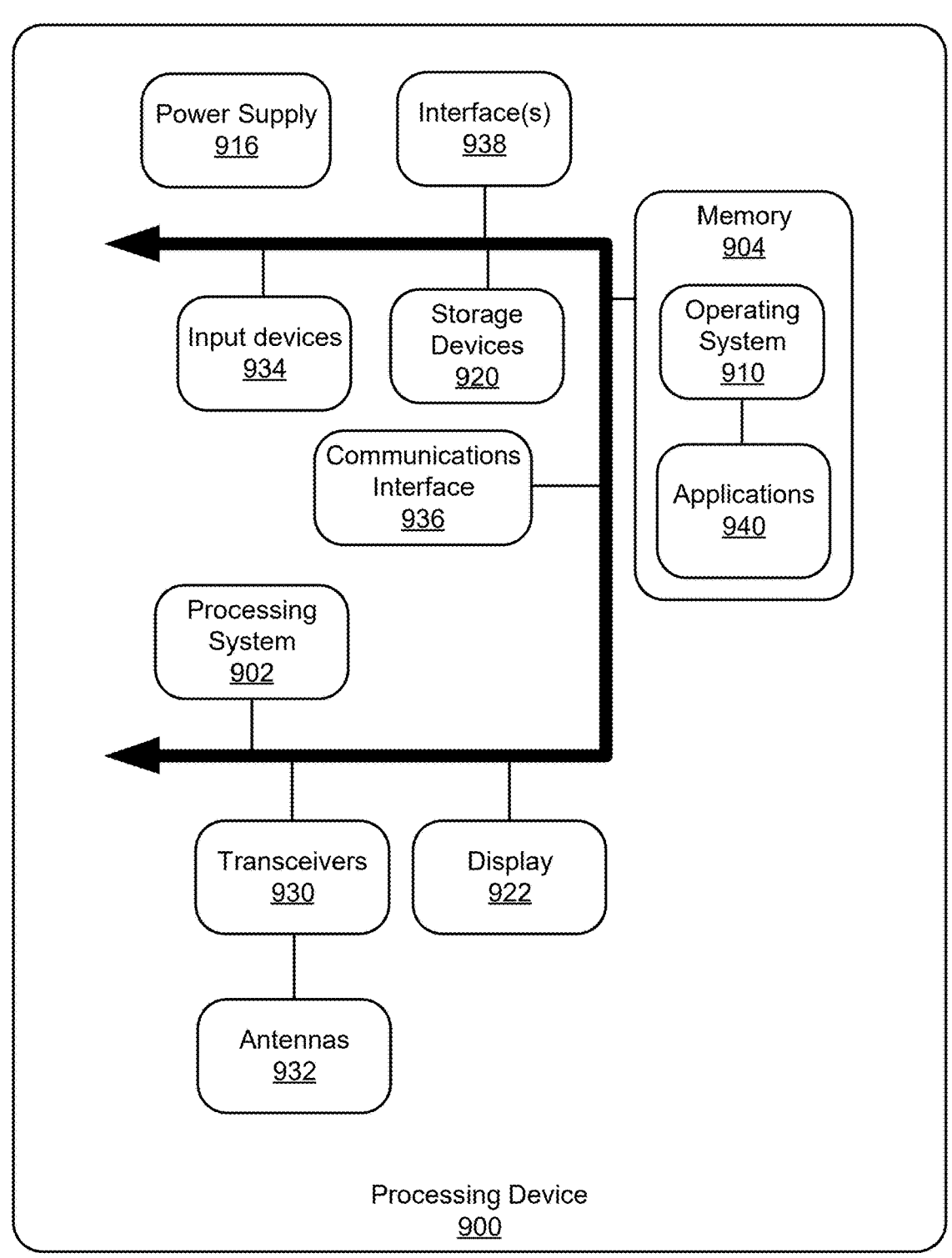
FIG. 9 illustrates an example schematic of a processing device suitable for implementing aspects of the disclosed technology.

FIG. 9 illustrates an example schematic of a processing device 900 suitable for implementing aspects of the disclosed technology. The processing device \900 includes a processing system 902, memory 904, a display 922, and other interfaces 938 (e.g., buttons). The processing system 902 may include one or more computer processing units (CPUs), graphics processing units (GPUs), etc.

The memory 904 generally includes both volatile memory (e.g., random access memory (RAM)) and non-volatile memory (e.g., flash memory). An operating system 910, such as the Microsoft Windows® operating system, the Microsoft Windows® Phone operating system or a specific operating system designed for a gaming device, may reside in the memory 904 and be executed by the processing system 902, although it should be understood that other operating systems may be employed.

One or more applications 940 (e.g., a root cause candidate identifier 112 or 22, a prompt generator 118, 218, an incident dependency prediction model 102, 222, an incident similarity model 208) are loaded in the memory 904 and executed on the operating system 910 by the processing system 902. In some implementations, aspects of the applications described herein loaded into memory of different processing devices connected across a network. The applications 940 may receive inputs from one another as well as from various input local devices 34 such as a microphone, input accessory (e.g., keypad, mouse, stylus, touchpad, gamepad, racing wheel, joystick), or a camera.

Additionally, the applications 940 may receive input from one or more remote devices, such as remotely-located servers or smart devices, by communicating with such devices over a wired or wireless network using more communication transceivers 930 and an antenna 932 to provide network connectivity (e.g., a mobile phone network, Wi-Fi®, Bluetooth®). The processing device 900 may also include one or more storage devices 920 (e.g., non-volatile storage). Other configurations may also be employed.

The processing device 900 further includes a power supply 916, which is powered by one or more batteries or other power sources and which provides power to other components of the processing device 900. The power supply 916 may also be connected to an external power source (not shown) that overrides or recharges the built-in batteries or other power sources.

The processing device 900 may include a variety of tangible computer-readable storage media and intangible computer-readable communication signals. Tangible computer-readable storage can be embodied by any available media that can be accessed by the processing device 900 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes RAM, read-only memory (ROM), electrically erasable programmable read-only memory (EEPROM), flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 900. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, intangible communication signals include wired media such as a wired network or direct-wired connection, and wireless media such as acoustic, radio frequency (RF), infrared and other wireless media.

In some aspects, the techniques described herein relate to a method of predicting incident dependency within a computer network. The method includes identifying similar historical incidents characterized by feature information satisfying first similarity criteria with the feature information for a newly-occurring network incident of interest, and obtaining causal dependency data for the similar historical incidents. The causal dependency data identifies historical responsible incidents responsible for causing the similar historical incidents. The method further includes: identifying candidate root cause incidents each occurring within a recent time interval and satisfying second similarity criteria with a corresponding one of the historical responsible incidents, and transmitting a prompt to an incident dependency prediction model. The prompt requests prediction of a root cause incident responsible for causing the newly-occurring network incident of interest and includes feature information for the newly-occurring network incident of interest and the feature information for each of the candidate root cause incidents. The method further provides for receiving, from the incident dependency prediction model, the root cause incident for the newly-occurring network incident of interest. The root cause incident is selected from among the candidate root cause incidents.

In some aspects, the techniques described herein relate to a method, wherein the first similarity criteria is assessed by an incident similarity model based on a comparison between a vectorized representation of the newly-occurring network incident of interest and vectorized representations of a set of historical incidents.

In some aspects, the techniques described herein relate to a method, wherein the incident dependency prediction model is trained on a dataset including feature information for historical network incidents and relationship data identifying causal dependencies among the historical network incidents and wherein the incident dependency prediction model uses learned relationships between the feature information and the relationship data for the historical network incidents to predict the relationship data for the newly-occurring network incident of interest.

In some aspects, the techniques described herein relate to a method, wherein the incident dependency prediction model is an instruction-tuned graph language model and the relationship data is semantic relationship data.

In some aspects, the techniques described herein relate to a method, wherein the incident similarity model generates and stores a vectorized representations of feature information for multiple historical incidents, the feature information including symptoms of each incident.

In some aspects, the techniques described herein relate to a method, further including: identifying remediation data stored in a database in association with one or more incidents of the historical responsible incidents, wherein the method further includes: returning information identifying predicted root cause incident and a suggested remediation measure.

In some aspects, the techniques described herein relate to a method, further including operations for training the incident dependency prediction model. The operations include obtaining incident data that includes feature information for observed network incidents and causal dependency information identifying dependencies between select pairs of the observed network incidents, and constructing at least one incident dependency graph characterized by a tree-like structure including nodes corresponding to the observed network incidents and edges respectively corresponding the dependencies between the select pairs of the observed network incidents such that each edge belongs to a path that intersects a root node representing a root cause incident and that is responsible, at least in part, for causing incidents corresponding to one or more lower-level nodes along the path. The operations further include generating semantic relationship data that describes relationships between nodes of the tree-like structure; constructing a training dataset that includes the semantic relationship data and the feature information for the observed network incidents; and training the incident dependency prediction model to identify a root cause incident for each of various incidents defined within the training dataset.

In some aspects, the techniques described herein relate to a method, wherein obtaining the incident data further includes: retrieving a dataset that includes feature information of multiple incidents and causal dependency data for a subset of the multiple incidents; training a classification model to utilize the feature information to infer one or more causal dependencies not initially included in the causal dependency data, the classification model applying a positive-unlabeled learning framework on a training dataset that includes the feature information and the causal dependency data for the subset of the multiple incidents; including the one or more causal dependencies inferred by the classification model in a dependency graph of the at least one incident dependency graph.

In some aspects, the techniques described herein relate to a system including: a prompt generator stored in memory that: queries an incident similarity model to identify and return similar historical incidents determined to satisfy similarity criteria with a newly-occurring network incident of interest; obtains causal dependency data for the similar historical incidents, the causal dependency data identifying historical responsible incidents responsible for causing the similar historical incidents; prompts the incident similarity model to identify and return candidate root cause incidents each occurring within a recent time interval and being selected based on an association with a corresponding one of the historical responsible incidents; generates a prompt for an incident dependency prediction model, the prompt requesting prediction of a root cause incident associated with the newly-occurring network incident of interest and including feature information of the newly-occurring network incident of interest and the feature information for each of the candidate root cause incidents; and receives, from the incident dependency prediction model, the root cause incident for the newly-occurring network incident of interest, the root cause incident identifying a select one of the candidate root cause incidents.

In some aspects, the techniques described herein relate to a system, wherein the similarity criteria is assessed by the incident similarity model based on a comparison between a vectorized representation of the newly-occurring network incident of interest and vectorized representations of a set of historical incidents.

In some aspects, the techniques described herein relate to a system, wherein the incident dependency prediction model is trained on a dataset including feature information for historical network incidents and relationship data identifying causal dependencies among the historical network incidents and wherein the incident dependency prediction model uses learned relationships between the feature information and the relationship data for the historical network incidents to predict the relationship data for the newly-occurring network incident of interest.

In some aspects, the techniques described herein relate to a system, wherein the incident dependency prediction model is an instruction-tuned graph language model and the relationship data is semantic relationship data.

In some aspects, the techniques described herein relate to a system, wherein the incident similarity model generates and stores a vectorized representations of feature information for multiple historical incidents, the feature information including symptoms of each incident.

In some aspects, the techniques described herein relate to a system, wherein the system is further configured to: identify remediation data stored in a database in association with one or more incidents of the historical responsible incidents; and return information identifying predicted root cause incident and a suggested remediation measure.

In some aspects, the techniques described herein relate to a system, further including: a dependency tree constructor stored in memory that: obtains historical incident data for historically-observed network incidents, the historical incident data including semantic descriptions for the historically-observed network incidents and causal dependency data identifying dependencies between select pairs of the historically-observed network incidents; constructs a historical relationship dependency graph having a tree-like structure, the tree-like structure including nodes corresponding to the historically-observed network incidents and edges respectively corresponding the dependencies between the select pairs of the historically-observed network incidents, each edge belonging to a path that intersects a root node representing a root cause incident that is responsible, at least in part, for causing incidents corresponding to one or more lower-level nodes along the path; a graph topology translator stored in memory that: receives the historical relationship dependency graph as input; and generates semantic relationship data that describes relationships between nodes of the tree-like structure, wherein the incident dependency prediction model is trained on a training dataset that includes the semantic relationship data and the semantic descriptions for the historically-observed network incidents.

In some aspects, the techniques described herein relate to a system, wherein the historical incident data further includes semantic descriptions for the historically-observed network incidents and causal dependency data for a limited subset of the historically-observed network incidents and wherein the system further includes: a dependency inference engine trained to applying a positive-unlabeled learning technique to infer one or more causal dependencies not initially identified in the causal dependency data based on the semantic descriptions for the historically-observed network incidents.

In some aspects, the techniques described herein relate to one or more tangible computer-readable storage media encoding processor-executable instructions for executing a computer process, the computer process including: prompting an incident similarity model to perform a first vector analysis to identify and return one or more similar historical incidents determined to satisfy similarity criteria with respect to a newly-occurring network incident of interest; obtaining causal dependency data for the similar historical incidents, the causal dependency data identifying historical responsible incidents responsible for causing the one or more similar historical incidents; prompting the incident similarity model to perform a second vector analysis to identify and return candidate root cause incidents each occurring within a recent time interval and being selected based on an association with a corresponding one of the historical responsible incidents; transmitting a prompt to an incident dependency prediction model, the prompt requesting prediction of a root cause incident responsible for causing the newly-occurring network incident of interest based on feature information for the newly-occurring network incident of interest and the feature information for each of the candidate root cause incidents; and receiving, from the incident dependency prediction model, the root cause incident for the newly-occurring network incident of interest, the root cause incident identifying a select one of the candidate root cause incidents.

In some aspects, the techniques described herein relate to one or more tangible computer-readable storage media, wherein the incident dependency prediction model is trained on a dataset including feature information for historical network incidents and relationship data identifying causal dependencies among the historical network incidents and wherein the incident dependency prediction model uses learned relationships between the feature information and the relationship data for the historical network incidents to predict the relationship data for the newly-occurring network incident of interest.

In some aspects, the techniques described herein relate to one or more tangible computer-readable storage media, wherein the incident dependency prediction model is an instruction-tuned graph language model and the relationship data is semantic relationship data.

In some aspects, the techniques described herein relate to one or more tangible computer-readable storage media, wherein the incident similarity model generates and stores a vectorized representations of feature information for multiple historical incidents, the feature information including symptoms of each incident.

In some aspects, the techniques described herein relate to a system for predicting incident dependency within a computer network. The system include a means for identifying similar historical incidents characterized by feature information satisfying first similarity criteria with the feature information for a newly-occurring network incident of interest. The system further includes a means for obtaining causal dependency data for the similar historical incidents. The causal dependency data identifies historical responsible incidents responsible for causing the similar historical incidents. The system further includes a means for identifying candidate root cause incidents each occurring within a recent time interval and satisfying second similarity criteria with a corresponding one of the historical responsible incidents, and a means for transmitting a prompt to an incident dependency prediction model. The prompt requests prediction of a root cause incident responsible for causing the newly-occurring network incident of interest and includes feature information for the newly-occurring network incident of interest and the feature information for each of the candidate root cause incidents. The method further provides for receiving, from the incident dependency prediction model, the root cause incident for the newly-occurring network incident of interest. The root cause incident is selected from among the candidate root cause incidents.

The logical operations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of example implementations.

What is claimed is:

1. A method of predicting incident dependency within a computer network, the method comprising:
identifying similar historical incidents characterized by feature information satisfying first similarity criteria with the feature information for a newly-occurring network incident of interest;
obtaining causal dependency data for the similar historical incidents, the causal dependency data identifying historical responsible incidents responsible for causing the similar historical incidents;
obtaining a set of recent network incidents that occurred within a specified recent time interval;
identifying, from the set of recent network incidents, candidate root cause incidents for the newly-occurring network incident of interest, each candidate root cause incident satisfying second similarity criteria with a corresponding one of the historical responsible incidents;
transmitting a prompt to an incident dependency prediction model, the prompt requesting prediction of a root cause incident responsible for causing the newly-occurring network incident of interest, the prompt including feature information for the newly-occurring network incident of interest and the feature information for each of the candidate root cause incidents; and
receiving, from the incident dependency prediction model, the root cause incident for the newly-occurring network incident of interest, the root cause incident identifying a select one of the candidate root cause incidents.

2. The method of claim 1, wherein the first similarity criteria is assessed by an incident similarity model based on a comparison between a vectorized representation of the newly-occurring network incident of interest and vectorized representations of a set of historical incidents.

3. The method of claim 1, wherein the incident dependency prediction model is trained on a dataset including feature information for historical network incidents and relationship data identifying causal dependencies among the historical network incidents and wherein the incident dependency prediction model uses learned relationships between the feature information and the relationship data for the historical network incidents to predict the relationship data for the newly-occurring network incident of interest.

4. The method of claim 3, wherein the incident dependency prediction model is an instruction-tuned graph language model and the relationship data is semantic relationship data.

5. The method of claim 2, wherein the incident similarity model generates and stores a vectorized representations of feature information for multiple historical incidents, the feature information including symptoms of each incident.

6. The method of claim 1, further comprising:
identifying remediation data stored in a database in association with one or more incidents of the historical responsible incidents, wherein the method further comprises:
returning information identifying predicted root cause incident and a suggested remediation measure.

7. The method of claim 1, further comprising operations for training the incident dependency prediction model, the operations including:
obtaining incident data that includes feature information for observed network incidents and causal dependency information identifying dependencies between select pairs of the observed network incidents;
constructing at least one incident dependency graph characterized by a tree-like structure including nodes corresponding to the observed network incidents and edges respectively corresponding the dependencies between the select pairs of the observed network incidents, each edge belonging to a path that intersects a root node representing a root cause incident that is responsible, at least in part, for causing incidents corresponding to one or more lower-level nodes along the path;
generating semantic relationship data that describes relationships between nodes of the tree-like structure;
constructing a training dataset that includes the semantic relationship data and the feature information for the observed network incidents; and
training the incident dependency prediction model to identify a root cause incident for each of various incidents defined within the training dataset.

8. The method of claim 7, wherein obtaining the incident data further includes:
retrieving a dataset that includes feature information of multiple incidents and causal dependency data for a subset of the multiple incidents;
training a classification model to utilize the feature information to infer one or more causal dependencies not initially included in the causal dependency data, the classification model applying a positive-unlabeled learning framework on a training dataset that includes the feature information and the causal dependency data for the subset of the multiple incidents; and
including the one or more causal dependencies inferred by the classification model in a dependency graph of the at least one incident dependency graph.

9. A system comprising:
a prompt generator stored in memory that:
queries an incident similarity model to identify and return similar historical incidents determined to satisfy similarity criteria with a newly-occurring network incident of interest;
obtains causal dependency data for the similar historical incidents, the causal dependency data identifying historical responsible incidents responsible for causing the similar historical incidents;
obtains a set of recent network incidents that occurred within a specified recent time interval;
prompts the incident similarity model to identify and return candidate root cause incidents for the network incident of interest, each candidate root cause interest selected from the set of recent network incidents based on an association with a corresponding one of the historical responsible incidents;

generates a prompt for an incident dependency prediction model, the prompt requesting prediction of a root cause incident associated with the newly-occurring network incident of interest and including feature information of the newly-occurring network incident of interest and the feature information for each of the candidate root cause incidents; and receives, from the incident dependency prediction model, the root cause incident for the newly-occurring network incident of interest, the root cause incident identifying a select one of the candidate root cause incidents.

10. The system of claim 9, wherein the similarity criteria is assessed by the incident similarity model based on a comparison between a vectorized representation of the newly-occurring network incident of interest and vectorized representations of a set of historical incidents.

11. The system of claim 9, wherein the incident dependency prediction model is trained on a dataset including feature information for historical network incidents and relationship data identifying causal dependencies among the historical network incidents and wherein the incident dependency prediction model uses learned relationships between the feature information and the relationship data for the historical network incidents to predict the relationship data for the newly-occurring network incident of interest.

12. The system of claim 11, wherein the incident dependency prediction model is an instruction-tuned graph language model and the relationship data is semantic relationship data.

13. The system of claim 9, wherein the incident similarity model generates and stores a vectorized representations of feature information for multiple historical incidents, the feature information including symptoms of each incident.

14. The system of claim 9, wherein the system is further configured to:

identify remediation data stored in a database in association with one or more incidents of the historical responsible incidents; and return information identifying predicted root cause incident and a suggested remediation measure.

15. The system of claim 9, further comprising:

a dependency tree constructor stored in memory that:

obtains historical incident data for historically-observed network incidents, the historical incident data including semantic descriptions for the historically-observed network incidents and causal dependency data identifying dependencies between select pairs of the historically-observed network incidents;

constructs a historical relationship dependency graph having a tree-like structure, the tree-like structure including nodes corresponding to the historically-observed network incidents and edges respectively corresponding the dependencies between the select pairs of the historically-observed network incidents, each edge belonging to a path that intersects a root node representing a root cause incident that is responsible, at least in part, for causing incidents corresponding to one or more lower-level nodes along the path;

a graph topology translator stored in memory that:

receives the historical relationship dependency graph as input; and generates semantic relationship data that describes relationships between nodes of the tree-like structure, wherein the incident dependency prediction model is trained on a training dataset that includes the semantic relationship data and the semantic descriptions for the historically-observed network incidents.

16. The system of claim 15, wherein the historical incident data further includes semantic descriptions for the historically-observed network incidents and causal dependency data for a limited subset of the historically-observed network incidents and wherein the system further includes:

a dependency inference engine trained to applying a positive-unlabeled learning technique to infer one or more causal dependencies not initially identified in the causal dependency data based on the semantic descriptions for the historically-observed network incidents.

17. One or more tangible computer-readable storage media encoding processor-executable instructions for executing a computer process, the computer process comprising:

prompting an incident similarity model to perform a first vector analysis to identify and return one or more similar historical incidents determined to satisfy similarity criteria with respect to a newly-occurring network incident of interest;

obtaining causal dependency data for the similar historical incidents, the causal dependency data identifying historical responsible incidents responsible for causing the one or more similar historical incidents;

obtaining a set of recent network incidents that occurred within a specified recent time interval;

prompting the incident similarity model to perform a second vector analysis to identify and return candidate root cause incidents for the network incident of interest each candidate root cause interest being selected from the set of recent network incidents based on an association with a corresponding one of the historical responsible incidents;

transmitting a prompt to an incident dependency prediction model, the prompt requesting prediction of a root cause incident responsible for causing the newly-occurring network incident of interest based on feature information for the newly-occurring network incident of interest and the feature information for each of the candidate root cause incidents; and receiving, from the incident dependency prediction model, the root cause incident for the newly-occurring network incident of interest, the root cause incident identifying a select one of the candidate root cause incidents.

18. The one or more tangible computer-readable storage media of claim 17, wherein the incident dependency prediction model is trained on a dataset including feature information for historical network incidents and relationship data identifying causal dependencies among the historical network incidents and wherein the incident dependency prediction model uses learned relationships between the feature information and the relationship data for the historical network incidents to predict the relationship data for the newly-occurring network incident of interest.

19. The one or more tangible computer-readable storage media of claim 18, wherein the incident dependency prediction model is an instruction-tuned graph language model and the relationship data is semantic relationship data.

20. The one or more tangible computer-readable storage media of claim 17, wherein the incident similarity model generates and stores a vectorized representations of feature information for multiple historical incidents, the feature information including symptoms of each incident.

* * * * *